United States Patent
Kataria et al.

(10) Patent No.: US 9,699,273 B2
(45) Date of Patent: *Jul. 4, 2017

(54) ADAPTABLE APPLICATIONS IN A CLIENT/SERVER ARCHITECTURE

(71) Applicant: International Business Machines Corporation, Armonk, NY (US)

(72) Inventors: Manish Kataria, Delhi (IN); Maureen G. Leland, Bolton, MA (US); Martin J. C. Presler-Marshall, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,831

(22) Filed: Nov. 10, 2016

(65) Prior Publication Data

US 2017/0163769 A1 Jun. 8, 2017

Related U.S. Application Data

(63) Continuation of application No. 14/957,747, filed on Dec. 3, 2015.

(51) Int. Cl.
| | |
|---|---|
| *G06F 15/16* | (2006.01) |
| *H04L 29/06* | (2006.01) |
| *H04L 12/24* | (2006.01) |
| *H04L 29/08* | (2006.01) |

(52) U.S. Cl.
CPC .............. *H04L 67/42* (2013.01); *H04L 41/14* (2013.01); *H04L 67/02* (2013.01)

(58) Field of Classification Search
None
See application file for complete search history.

(56) References Cited

U.S. PATENT DOCUMENTS

| | | |
|---|---|---|
| 6,401,238 B1 | 6/2002 | Brown et al. |
| 6,546,554 B1 | 4/2003 | Schmidt et al. |
| 6,557,054 B2 | 4/2003 | Reisman |
| 6,615,253 B1 | 9/2003 | Bowman-Amuah |
| 7,594,003 B2 | 9/2009 | Davidson et al. |
| 8,347,287 B2 | 1/2013 | Kakinari et al. |
| 8,522,227 B2 | 8/2013 | Santos et al. |

(Continued)

FOREIGN PATENT DOCUMENTS

WO 2007109980 A2 9/2009

OTHER PUBLICATIONS

IBM: List of IBM Patents or Patent Applications Treated As Related (Appendix P), Dec. 7, 2016, 2 pages.

(Continued)

*Primary Examiner* — Ranodhi Serrao
(74) *Attorney, Agent, or Firm* — Teddi E. Maranzano

(57) ABSTRACT

Adapting web-based applications in a client/server web-based architecture is provided. At least a first version and a second version of a client/server application is provided. An adaptable application platform monitors a client and a server in a client/server web-based architecture for one or more performance characteristics. If one or more configurable performance characteristics exceeds a threshold, the adaptable application platform switches dynamically between executing the first version to executing the second version. The first version is server preferring and the second version is client preferring.

1 Claim, 3 Drawing Sheets

(56) References Cited

U.S. PATENT DOCUMENTS

| | | |
|---|---|---|
| 9,443,213 B1 | 9/2016 | Kataria et al. |
| 2004/0201604 A1 | 10/2004 | Kraenzel et al. |
| 2005/0188051 A1 | 8/2005 | Sneh |
| 2007/0033569 A1 | 2/2007 | Davidson et al. |
| 2014/0123149 A1 | 5/2014 | Maple et al. |
| 2014/0173585 A1 | 6/2014 | Firman et al. |
| 2014/0289719 A1 | 9/2014 | Dewan |

OTHER PUBLICATIONS

Pending U.S. Appl. No. 14/957,747, filed Dec. 3, 2015, entitled: "Adaptable Applications in a Client/Server Architecture", 19 pages.
Pending U.S. Appl. No. 15/239,040, filed Aug. 17, 2016, entitled: "Adaptable Applications in a Client/Server Architecture", 16 pages.

ADAPTABLE APPLICATIONS IN A CLIENT/SERVER ARCHITECTURE

BACKGROUND

Embodiments of the present invention relate generally to the field of computer client/server architecture, and more particularly to adaptable applications in a client/server architecture.

The decision whether a web-based application should execute on the client side or the server side typically is made during the design process. However at design time the server infrastructure or client capabilities may be unknown. Consequently, the application developer estimates the average client/server configuration and capabilities, and the assignment of client/server responsibilities is final once the application is written. This allocation of application responsibilities may result in an unsatisfactory balance, for example, when a powerful client machine is idle while a server has a heavy processing load, or an expensive server infrastructure is underutilized while less powerful client machines struggle to execute the application.

A responsive client/server web-based architecture whereby the application dynamically adjusts to the client/server conditions may allow an application to perform optimally under varying conditions.

SUMMARY

According to one embodiment, a processor-implemented method for adapting web-based applications in a client/server web-based architecture is provided. The method provides at least a first version and a second version of a client/server application. The method monitors a client and a server in a client/server web-based architecture for one or more performance characteristics, and responsive to detecting the one or more performance characteristics exceeding a threshold, switching dynamically between executing the first version to executing the second version.

According to another embodiment, a computer program product for adapting web-based applications in a client/server web-based architecture is provided. An adaptable application platform embodied on a computer readable storage medium, includes program instructions executable by a processor. Program instructions are included to provide at least a first version and a second version of a client/server application. The computer program product includes program instructions to monitor a client and a server in a client/server web-based architecture for one or more performance characteristics, and responsive to program instructions to detect the one or more performance characteristics exceeding a threshold, program instructions switch dynamically between executing the first version to executing the second version.

According to another embodiment, a computer system for adapting web-based applications in a client/server web-based architecture is provided. The computer system includes one or more processors, one or more computer-readable storage devices, and a plurality of program instructions stored on at least one of the one or more storage devices for execution by at least one of the one or more processors. The plurality of program instructions provide at least a first version and a second version of a client/server application. The program instructions monitor a client and a server in a client/server web-based architecture for one or more performance characteristics, and responsive to program instructions to detect the one or more performance characteristics exceeding a threshold, the program instructions switch dynamically between executing the first version to executing the second version.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
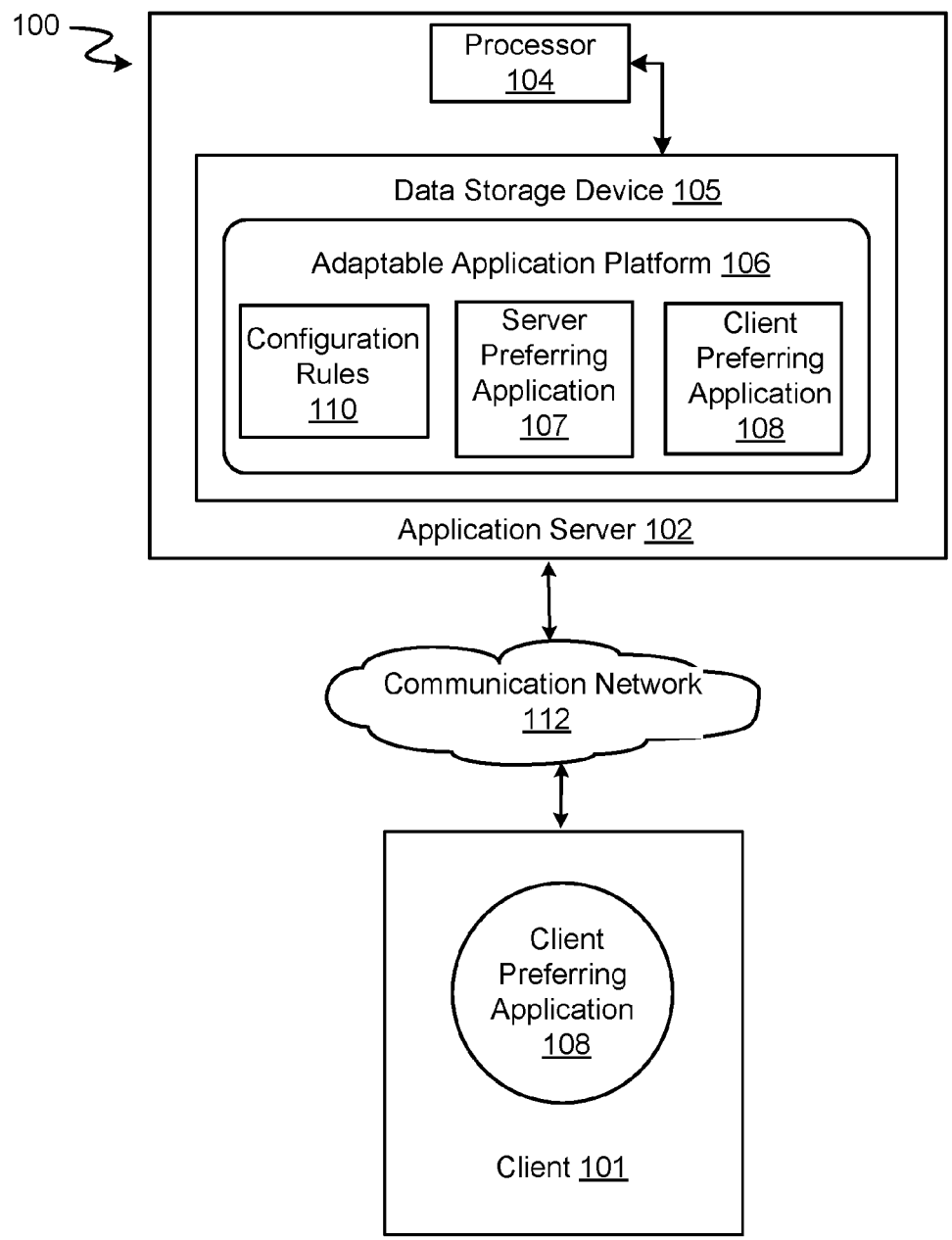
FIG. 1 illustrates an exemplary computer system environment operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of computer client/server architecture, and more particularly to adaptable applications in a client/server architecture.

The following described exemplary embodiments provide a system, method and program product having the capacity to improve the technical field of client/server web-based architectures by providing a responsive architecture whereby an application can present two or more different versions of itself to a client. When a client sends a connection request to a server to execute an application, an adaptable application platform presents to a client a version of the application that provides consistent responsiveness to the client and maximizes throughput at the server. The adaptable application platform uses one or more configuration rules to monitor various performance metrics, such as server CPU utilization and network latency between the client and server. The processing capabilities of the requesting client are also evaluated. These include the client's generation of web browser, such as Web 1.0 or Web 4.0, which specifies what features are enabled in the browser architecture. The adaptable application platform also evaluates the client's hardware, particularly processor speed and type of internet connection (i.e., modem, DSL, high-speed internet). The values of one or more of the configuration rules may be weighted. Thus, the adaptable application platform dynamically responds to the client with a version of the application that is adapted to the current server or client conditions. The server may evaluate the server and client conditions upon each client contact during the application execution, and may send a different version of the application to the client depending upon the current server or client conditions. In another embodiment, the client may send its processing capabilities to the server for use on its initial connection request.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

FIG. 1 depicts an exemplary networked client/server computer environment 100 according to at least one embodiment. The networked computer environment 100 may include an application server 102 with a processor 104 and a data storage device 105 that is enabled to run an adaptable application platform 106. The networked computer environment 100 may include a plurality of application servers 102 and clients 101, only one of which is shown for illustrative brevity. The client 101 is enabled to run a server preferring application 107 or a client preferring application 108, and is enabled to connect to a communication network 112. The adaptable application platform 106 includes functions that extend the capabilities of a client/server web-based architecture. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 101 may communicate with the application server 102 via the communications network 112. The communications network 112 may include connections, such as wire, wireless communication links, or fiber optic cables. As will be discussed with reference to FIG. 3, the application server 102 and the client 101 may include internal components 800 and external components 900, respectively. The client 101 may be any type of computing device capable of running a program and accessing a network.

The adaptable application platform 106 contains at least two versions of a web-based application program: a server preferring one that executes primarily on the application server 102 and a client preferring one that executes primarily on the client 101. The adaptable application platform 106 periodically monitors performance metrics on the application server 102 and the client 101 and evaluates the results against one or more configuration rules 110 to determine, at runtime, which variant of the application to deploy. For example, CPU utilization beyond a defined threshold may indicate that the client preferring application 108 should be deployed to the client 101 because the server is too busy to adequately respond to client requests. In this case, the application server 102 packages most of the executable program code, for example JavaScript or JSON, and the data. The application server 102 responds with the client preferring application 108 and the packaged executable code and data, which the client preferring application 108 will unpack and execute at the client 101. In this case the adaptable application platform 106 determined that considering the runtime conditions the client 101 can execute the application more efficiently than the application server 102. Unfavorable network conditions between the client 101 and the application server 102, such as high latency and low bandwidth, may indicate that the server preferring application 107 should be deployed to the client 101. In this case, the application server 102 assumes the responsibility for executing the application because multiple interactions over the network would result in poor performance. The client 101 may indicate some of its processing capabilities to the application server 102 upon invoking the application. For example, depending on the efficiency and responsiveness of the client 101 browser version, such as Web 1.0, the adaptable application platform 106 may respond using simple HTML pages or with more resource-intensive JavaScript.

Figure 2:
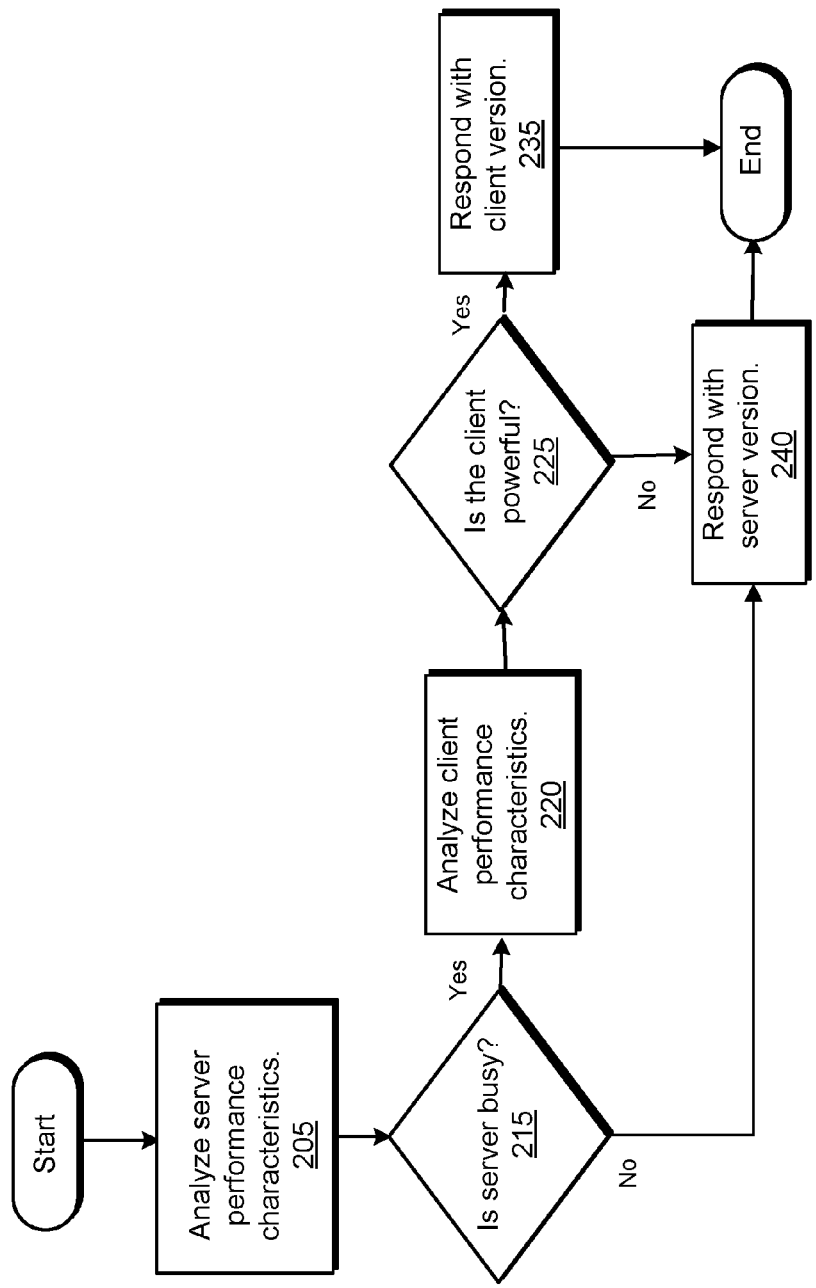
FIG. 2 illustrates an operational flowchart for adaptable applications in a client/server architecture, according to various embodiments of the disclosure.

FIG. 2 illustrates a flowchart operational for adaptable applications in a client/server architecture. Based on evaluating the configuration rules 110, at 205 the adaptable application platform 106 executes either a server preferring application 107 or a client preferring application 108, based on analyzing the server performance characteristics. An operating system gathers and exposes various performance metrics that administrators and developers, among others, may monitor. For example, in a client/server architecture, the application server 102 may have a maximum number of threads for concurrent connections from clients. The application server 102 may reject further client connections until the number of concurrent connections falls below the maximum. Other representative performance metrics include system load, CPU utilization, I/O reads/transfers per second per device, and memory utilization. At 215, the adaptable application platform 106 may evaluate one or more configuration rules 110 against the corresponding exposed application server 102 performance metrics to determine whether the server is busy. For example, a configuration rule may specify that if CPU utilization reaches a threshold percentage, then respond to the client 101 request with a version that is the client preferring application 108. Similar thresholds may be specified for other performance metrics. For example, if the adaptable application platform 106 detects that the number of concurrent connections reaches a threshold number, then respond to the client 101 request with a version that is the client preferring application 108. Therefore at 215, if the application server 102 metrics are within the configuration rule 110 thresholds, then at 240 the adaptable application platform 106 responds to the client 101 request with a version that is the server preferring application 107.

If at 215 one or more application server 102 performance metrics exceeds the corresponding configuration rule 110, then at 220 the adaptable application platform 106 analyzes the client 101 performance characteristics. Even though the application server 102 is busy, the server preferring application 107 still may be indicated. For example, the network connection between the client 101 and application server 102 may not meet a minimum bandwidth or may exceed a latency threshold percentage, as defined in one or more configuration rules 110. This may occur if the client 101 connection is through modem or DSL rather than a high-speed internet connection. The client 101 processing capabilities may be further evaluated based on tags or other identifying fields in the web page on the initial connection request. For example, if the client 101 executes an older web browser, then HTML may be preferred over JavaScript. At 225, the adaptable application platform 106 evaluates the client 101 performance characteristics against the configuration rules 110 and determines which version of the application is indicated to provide optimal performance. In evaluating the overall preference for a client-based or a server-based version of the application, the various configuration rules 110 may be weighted, for example, to prefer network conditions over server CPU utilization. Therefore, at 225 if the server is busy but the client is not powerful, either because of network conditions, level of web browser, or speed of the client hardware, then at 240 the adaptable application platform 106 responds to the client 101 request with a version that is the server preferring application 107. However, at 235 the client 101 request is answered with the version that is the client preferring application 108 if the application server 102 is busy, but the performance characteristics of the client 101 indicate the client 101 can provide optimal performance. The adaptable application platform 106 may periodically re-evaluate network conditions and client/server performance characteristics during the application execution. Therefore, the adaptable application platform 106 dynamically responds to the client 101 with a version of the application that is adapted to the current server or client conditions. In an embodiment, the client 101 may send its processing capabilities to the application server 102 on its first connection request.

Figure 3:
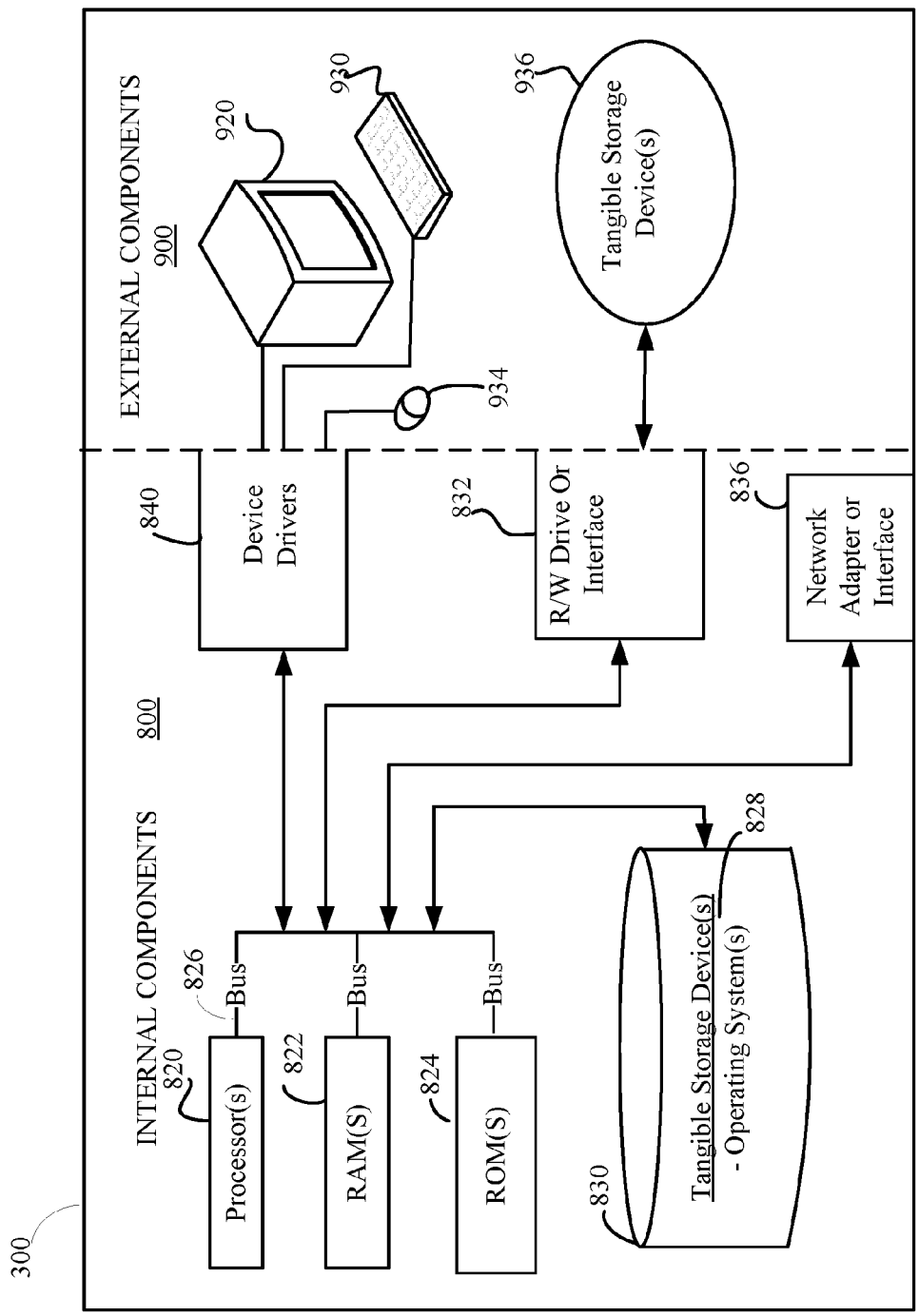
FIG. 3 is a schematic block diagram of the hardware and software of the computer environment according to an embodiment of the method of FIG. 2.

FIG. 3 illustrates an exemplary computing device 300 applicable for executing the method of FIG. 2. Computing device 300 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method illustrated in FIG. 2; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a Ethernet adapter cards, wireless WI-FI interface cards, or 3G or 4G wireless interface cards or other wired or wireless communication links. The operating system 828 that is associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective tangible storage device 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer program product in a non-transitory computer readable storage medium for adapting web-based applications in a client/server architecture, comprising:
    an adaptable application platform embodied on the non-transitory computer readable storage medium, the adaptable application platform including program instructions executable by a processor, the program instructions comprising:
    program instructions stored on the non-transitory computer readable storage medium for execution by a processing unit via the non-transitory computer readable storage medium, the program instructions comprising:
    program instruction to provide at least a first version and a second version of a client/server application wherein the first version executes primarily on an application server, executes a web-based application on the application server and sends an execution result to a client wherein the client renders the execution result in a web browser on the client, and wherein the second version executes primarily on the client and receives a package of data and executable code from the application server and wherein the client executes the received executable code using the received data and renders the execution result in the web browser on the client;

program instructions to monitor, by an adaptable application platform, the client and the application server in the client/server architecture for one or more performance characteristics, wherein the one or more performance characteristics include CPU utilization, network latency, and network bandwidth between the client and the application server, and wherein the one or more performance characteristics are configurable and weighted; and responsive to detecting the one or more performance characteristics exceeding a configurable threshold, program instructions to switch dynamically between executing the first version to executing the second version.

* * * * *